(12) United States Patent
Becht, IV et al.

(10) Patent No.: US 8,205,831 B2
(45) Date of Patent: Jun. 26, 2012

(54) MODULAR HELICOPTER DECK FOR OFFSHORE OIL DRILLING/PRODUCTION PLATFORMS

(75) Inventors: Charles Becht, IV, Morristown, NJ (US); Chawki A. Benteftifa, Carlstadt, NJ (US)

(73) Assignee: Helidex LLC, Liberty Corner, NJ (US)

( * ) Notice: Subject to any disclaimer, the term of this patent is extended or adjusted under 35 U.S.C. 154(b) by 973 days.

(21) Appl. No.: 12/229,580

(22) Filed: Aug. 25, 2008

(65) Prior Publication Data
US 2009/0057486 A1    Mar. 5, 2009

Related U.S. Application Data

(60) Provisional application No. 60/967,304, filed on Sep. 4, 2007.

(51) Int. Cl.
*B64F 1/36* (2006.01)
(52) U.S. Cl. .................................................. 244/114 R
(58) Field of Classification Search .............. 244/114 R; 52/98, 314, 573.1, 630, 578, 580, 588.1, 52/582.1, 582.2; 14/73, 73.1
See application file for complete search history.

(56) References Cited

U.S. PATENT DOCUMENTS

| | | | |
|---|---|---|---|
| 4,116,408 A | 9/1978 | Soloy | |
| 4,474,130 A | 10/1984 | Birkeland | |
| 4,665,857 A | 5/1987 | Akerman et al. | |
| 4,789,116 A * | 12/1988 | Eftestol | 244/114 R |
| 4,836,472 A * | 6/1989 | Sutter et al. | 244/114 R |
| 5,033,147 A * | 7/1991 | Svensson | 14/73 |
| 5,351,915 A | 10/1994 | Aandalen | |
| 5,819,491 A * | 10/1998 | Davis | 52/592.1 |
| D459,491 S | 6/2002 | Benteftifa et al. | |
| D480,157 S | 9/2003 | Benteftifa et al. | |
| D550,861 S * | 9/2007 | Brabeck et al. | D25/123 |

* cited by examiner

*Primary Examiner* — Tien Dinh
(74) *Attorney, Agent, or Firm* — Gerald E. Hespos; Michael J. Porco

(57) ABSTRACT

A heliport is formed by the assembly of a planar member including longitudinally-extending deck materials, each of which has a longitudinally-extending T-slot formed in the upper side thereof and is connected to a plurality of deck slats. Each deck slat is of generally I-beam configuration, with the lower flange thereof having a plurality of longitudinally-extending striations. A plurality of fixture blocks is provided, with each fixture block having a hole therein and including a plurality of striations for cooperatively engaging the striations in the lower flange of a deck slat. The head of a carriage bolt is disposed in the T-slot of the longitudinal deck materials, and extends through the fixture block, and is connected at its opposite end to a deck slat by a washer and nut, thereby providing a rigid interconnection between the deck slats and the planar member.

12 Claims, 6 Drawing Sheets

MODULAR HELICOPTER DECK FOR OFFSHORE OIL DRILLING/PRODUCTION PLATFORMS

This application claims priority from U.S. Provisional Application No. 60/967,304, filed Sep. 4, 2007, which is incorporated herein by reference.

BACKGROUND OF THE INVENTION

1. Field of the Invention

A helicopter deck preferably for use on offshore oil drilling/production platforms is constructed of modular panels, made of aluminum stringers, which are supported and attached to a preferably polygon circumferential frame made of steel I-beams.

2. Description of the Related Art

Helicopter landing pads which are designed for use on offshore oil drilling/production platforms are usually assembled in place, with the individual structural members and stringers being rigidly and fixedly connected to the drilling platform by nuts and bolts. This results in increased expense in assembly and additional time for assembling the prior art helicopter decks.

A prior art helicopter deck is disclosed in U.S. Pat. No. 5,351,915 which issued on Oct. 4, 1994 and is entitled "Helicopter Deck". The latter comprises a supporting main frame structure to which is assembled a plurality of elongated deck elements in the form of extruded metal profiles. The extruded metal profiles are individually assembled and connected to the supporting deck and, thus, there is increased cost and assembly time for the helicopter deck disclosed in U.S. Pat. No. 5,351,915.

Reference is also made to other forms of helicopter deck structures which are designed for use in offshore drilling/production platforms and which require the individual assembly of stringers or beams to the supporting structure. As an example, reference is made to U.S. Pat. No. 4,665,857 which issued on May 19, 1987 and is entitled "Landing Pad and Hanger Structure for Vertical Take-Off and Landing Aircraft". In the latter patent, the individual support structure is first assembled on the deck of the ship, after which individual stringers or beams are secured to the support structure for defining the landing pad.

Other prior art helicopter decks are disclosed in U.S. Pat. No. 4,116,408 which issued on Sep. 26, 1978 and is entitled "Portable Heliport" and U.S. Pat. No. 4,474,130 which issued on Oct. 2, 1984 and is entitled "Helicopter Deck Preferably for Use in Offshore Drilling Production Platforms".

The prior art also includes new and improved aluminum extrusions of the type disclosed in applicants' U.S. Design Pat. No. 480,157 which issued on Sep. 30, 2002 and U.S. Design Pat. No. 459,491 which issued on Jun. 25, 2002.

The extruded deck beams of U.S. Design Pat. Nos. 480,157 and 459,491 are interconnected at their upper ends by a tongue-and-groove interconnection, with the lower ends thereof being bolted to the support structure so as to form a plurality of modular panels which are secured to a supporting structure.

Each panel includes suitable hatchways which lead to structural supports for enabling the entire helicopter deck to be considered as a unit for fixture to the supporting I-beam structure or the planar support structure.

In the assembly of the prior art helicopter deck, the holes extending through the deck slats and the support structure are individually drilled at the site, thereby resulting in a very time-consuming and expensive assembly and the generation of debris at the site in the form of drilling shavings.

It is an object of the subject invention to provide a new and improved aluminum extrusion of the type used in a helicopter landing deck, as well as a new and improved method of interconnecting the aluminum extrusions to the supporting I-beam structure which facilitates assembly and which minimizes the cost of construction.

It is a further object of the subject invention to provide a modular construction of a helicopter deck, along with the use of new and improved extruded aluminum alloy stringers of the subject invention, so as to provide a light-weight landing pad structure which is readily assembled and cost effective, as well as minimizing on-site production assembly time, and which can be readily disassembled as required in a minimum amount of time.

Furthermore, it is an object of the subject invention to provide a more secure attachment between the modular aluminum extrusions to the supporting I-beam structure or the planar support structure.

SUMMARY OF THE INVENTION

The new and improved helicopter deck of the subject invention includes deck slats which are an improvement over applicants' prior U.S. Design Pat. Nos. 480,157 and 459,491. More particularly, the elongated deck slats of the subject invention include an upper deck having longitudinally-extending parallel projections for preventing slippage on the resulting helicopter deck, v-shaped vertical struts, and a lower flange, one side of which is a planar extension, while the other side of the lower flange includes longitudinally-extending, parallel projections of generally square configuration.

The I-beams of the helicopter deck of the subject invention include longitudinally extending T-shaped, keyway slots in the upper flange thereof for accommodating the heads of carriage bolts. The bolts extend through fixture blocks that have cooperating, longitudinally-extending, parallel square cutouts which receive the square projections of the deck slats. The bolts are secured by means of washers and nuts, thereby providing a substantially rigid connection between the I-beams and the deck slats, as well as providing maximum surface contact therebetween in order to provide a stronger and more rigid interconnection between the I-beams and the deck slats.

The deck slats are bolted to the I-beams at the job site, and the holes in the fixture blocks are pre-drilled at the factory, thereby facilitating the rapid assembly of the helicopter deck.

The resulting modular structure is cost effective as compared to conventional stick frame construction, as in the prior art, and provides a more rigid and substantial helicopter deck structure.

DETAILED DESCRIPTION OF THE PREFERRED EMBODIMENT

Figure 1:
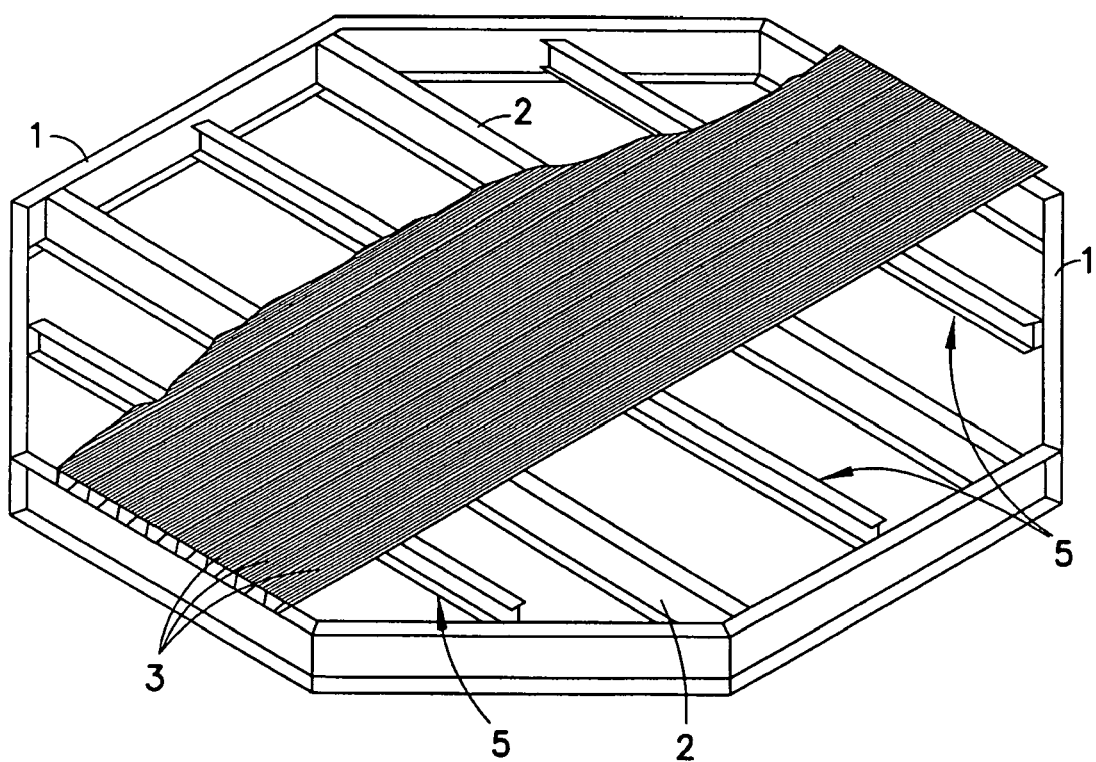
FIG. 1 is a simplified, diagrammatical representation illustrating a helicopter deck according to the prior art as seen from above, and wherein most of the deck elements are omitted in order to show the underlying structure.

Turning to FIG. 1, there is illustrated a prior art helicopter deck which basically includes an octagonal circumferential frame included in the helicopter deck's main frame which, moreover, comprises intermediate beams 2, 5. The intermediate beams 2 are rigidly anchored to the circumferential frame 1. Usually, the circumferential frame 1 is made of steel I-beams, while the parallel, extending deck elements 3 are extruded aluminum.

Figure 2:
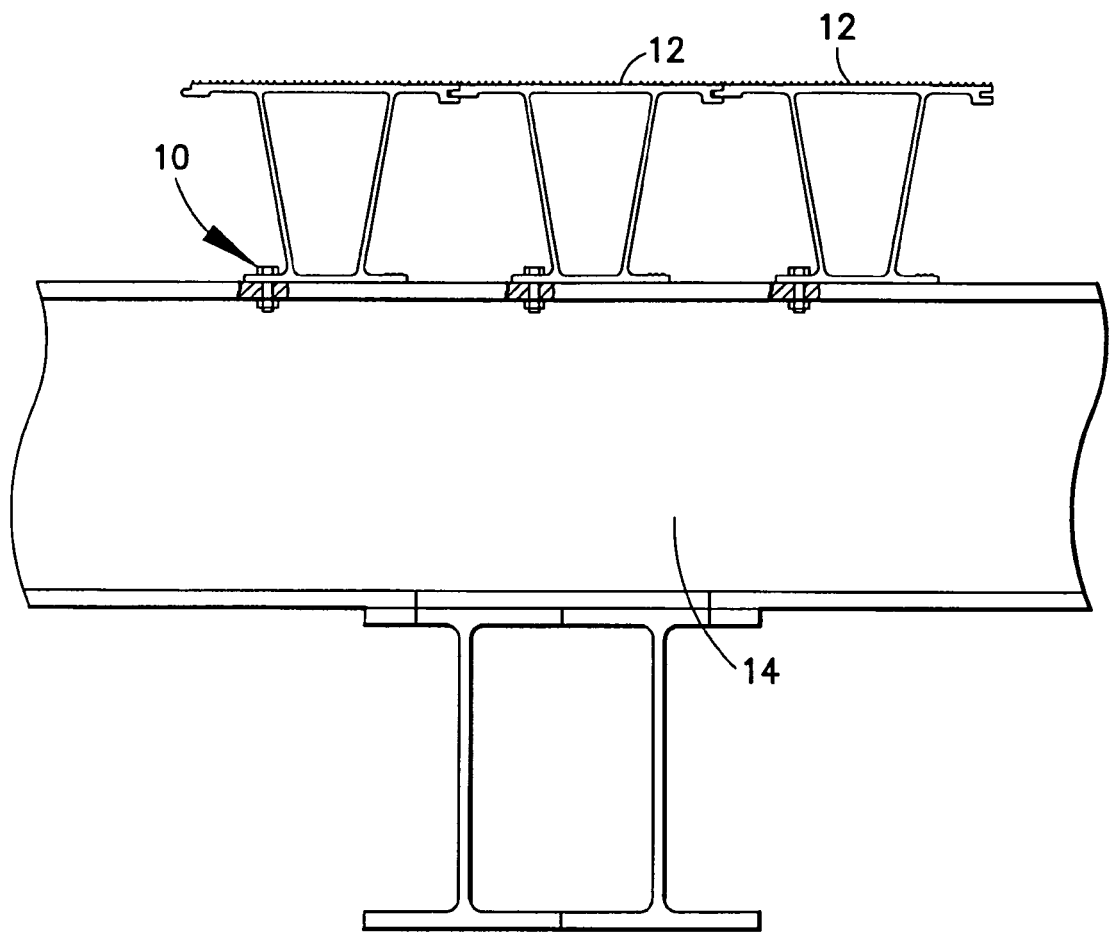
FIG. 2 illustrates a prior art interconnection system between deck slats and the I-beam support structure of a helicopter deck.

Turning to FIG. 2, there is illustrated an interconnection system utilizing the aluminum deck slats of U.S. Design Pat. Nos. 459,491 and 480,157 and the supporting steel I-beam structure. The interconnection basically includes bolts which are designated by the numeral 10 which extend through holes drilled in the lower flange of the deck slats 12 and the upper flange of the I-beam girder structure 14. As can be appreciated, the time consumed in drilling and interconnecting the bolts is extensive, thereby resulting in high assembly costs.

As an example, for a heliport deck on the order of 50 feet×50 feet, under the prior art system where the holes are drilled at the site, there are approximately 2,000 holes which have to be drilled through the deck slats and the supporting I-beam structure. Then the structures are bolted together with the holes aligned. It usually takes between 5 and 6 days in order to complete the assembly of the prior art helicopter deck which is very costly and time-consuming and results in debris on the deck resulting from the drill shavings.

In sharp contrast to the prior art system, the modular helicopter deck of the subject invention using the improved deck slat, as well as the unique interconnection system of the subject invention, is less costly and more efficient than the prior art system. One reason is that the holes in the T-shaped slots in the supporting structure obviate the requirement for holes to be drilled in the supporting structure and greatly facilitate the assembly of the bolt heads of the carriage bolts into the supporting structure preparatory to engaging the fixture blocks and the deck slats.

As an example of the savings in time and assembly cost, in a helicopter deck structure on the order of 50 feet×50 feet, the entire helicopter deck may be assembled within 2 to 3 days, which is approximately half of the time that is normally required for assembling the prior art helicopter deck of the same size. In addition, there is no debris resulting from the assembly of the helicopter deck according to the subject invention at the construction site. Still further, disassembly of the subject helicopter deck is readily accommodated because of the T-shaped slots in the supporting structure.

Figure 3:
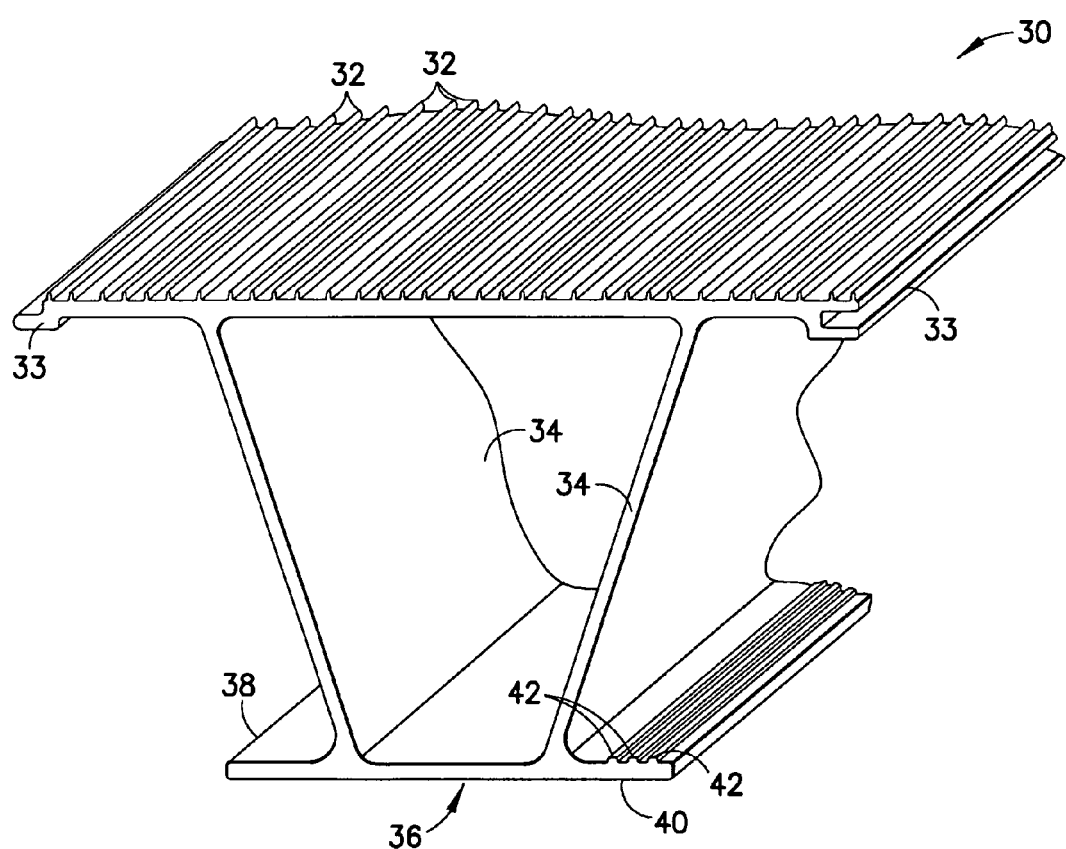
FIG. 3 is a perspective view of a deck slat showing the new design of the subject invention.

Turning to FIG. 3, the deck slat 30 of the subject invention is an aluminum extrusion which includes an upper deck portion having longitudinally extending, triangular-shaped projections 32. The projections 32 provide sure footing both for individuals as well as the helicopter wheels on the upper deck of the helicopter pad. The opposite ends of the upper deck portion include a tongue-and-groove 33 configuration for interconnecting the respective upper portions of the contiguous deck slats 30.

The deck slat 30 further includes v-shaped vertical supports 34 which are connected to the lower base 36. One end of the lower base includes a planar extension 38, while the planar opposite side 40 includes a plurality of longitudinally-extending, parallel projections 42 of generally square configuration. As illustrated in FIG. 3, there are preferably three parallel projections 42, although additional projections may be provided, and it is recommended that at least two parallel projections be provided on the side 40 of the lower flange.

Figure 4:
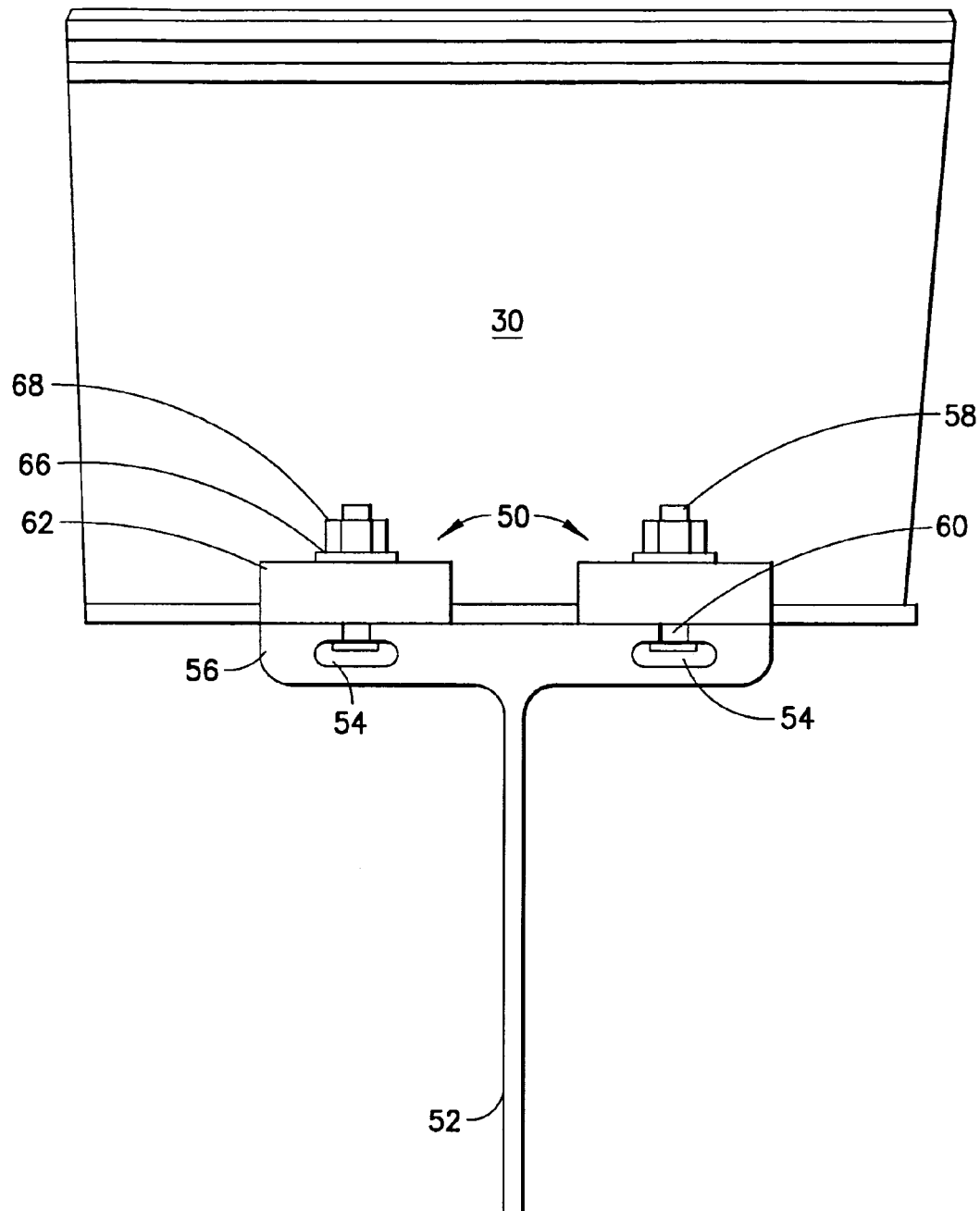
FIG. 4 is a side elevational, perspective view of the interconnection between an I-beam and a deck slat of the subject invention.
Figure 5:
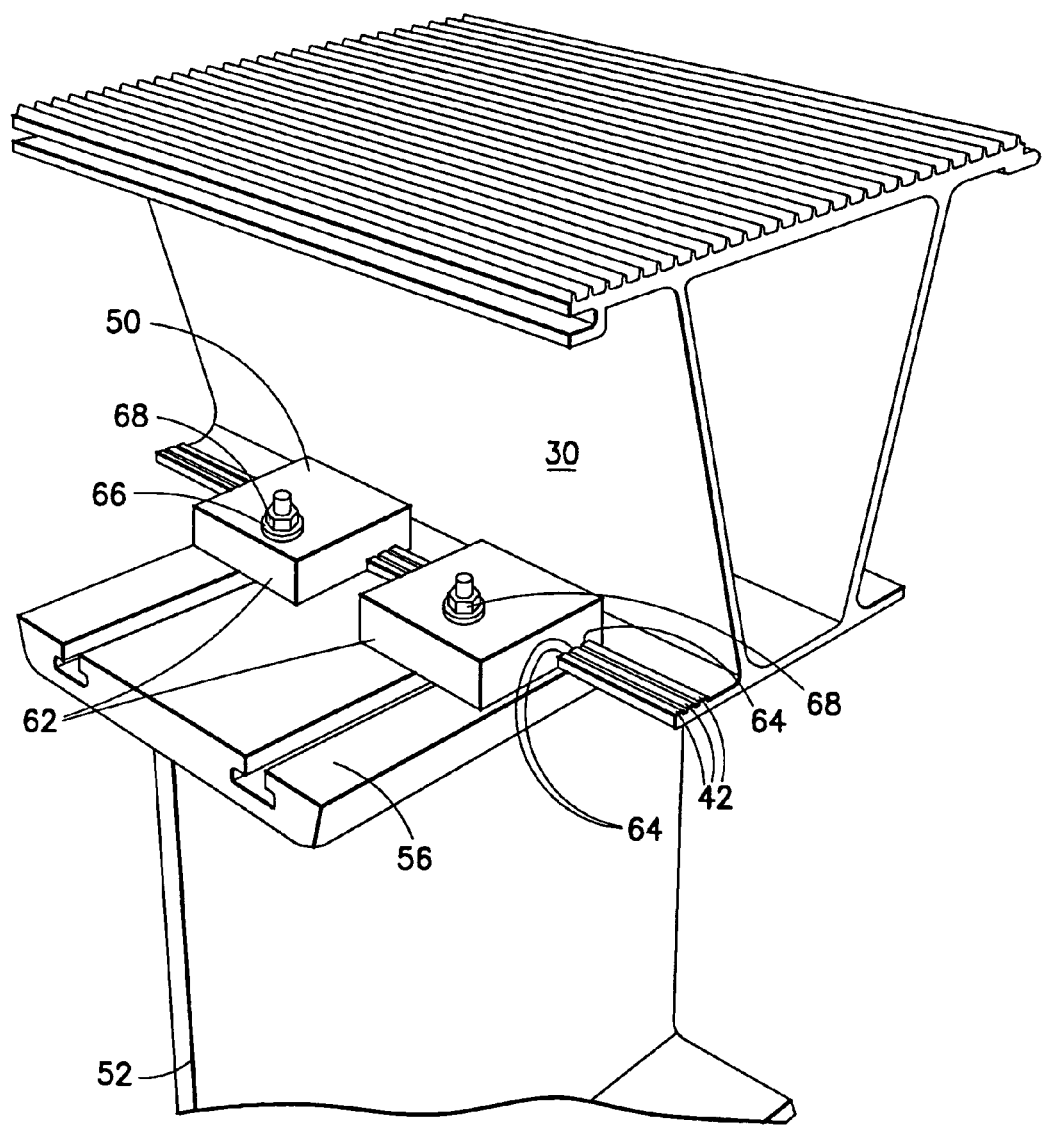
FIG. 5 is a perspective view showing the interconnection system between the I-beam and the deck slat of the subject invention.

Turning to FIGS. 4 and 5, the interconnection between the steel I-beam 52 and the deck slat 30 is generally designated by the numeral 50. Each I-beam 52 includes two longitudinally-extending, T-shaped keyway slots 54, 54 cut into the upper flange 56 of the I-beam 52.

The interconnection system 50 includes carriage bolts 58, the heads 60 of which are respectively disposed in the keyway slots 54.

Turning to FIG. 5, the carriage bolts 58 extend through pre-drilled holes in fixture blocks 62 which have cooperating, longitudinally-extending, parallel square cutouts 64 which receive the projections 42 of the deck slat 30. The bolts are tightened by means of washers 66 and nuts 68.

The resulting interconnection between the deck slat 30 and the I-beam 52 includes two interconnection systems 50 which provide maximum surface area contact between the deck slat 30 and the I-beam 52 thereby providing a more structurally significant, and quickly assembled, interconnection system. Pre-drilling of the holes in the fixture blocks 62, as well as the pre-formed T-slots 54 in the I-beam 52, further facilitate assembly and disassembly of the helicopter deck.

Furthermore, the interconnection systems 50 may be readily disconnected, when required, for disassembly of the helicopter deck.

The resulting helicopter deck of the subject invention provides an extruded deck surface including a non-slip upper surface and modular construction resulting in cost-effective assembly of the helicopter deck.

Figure 6:
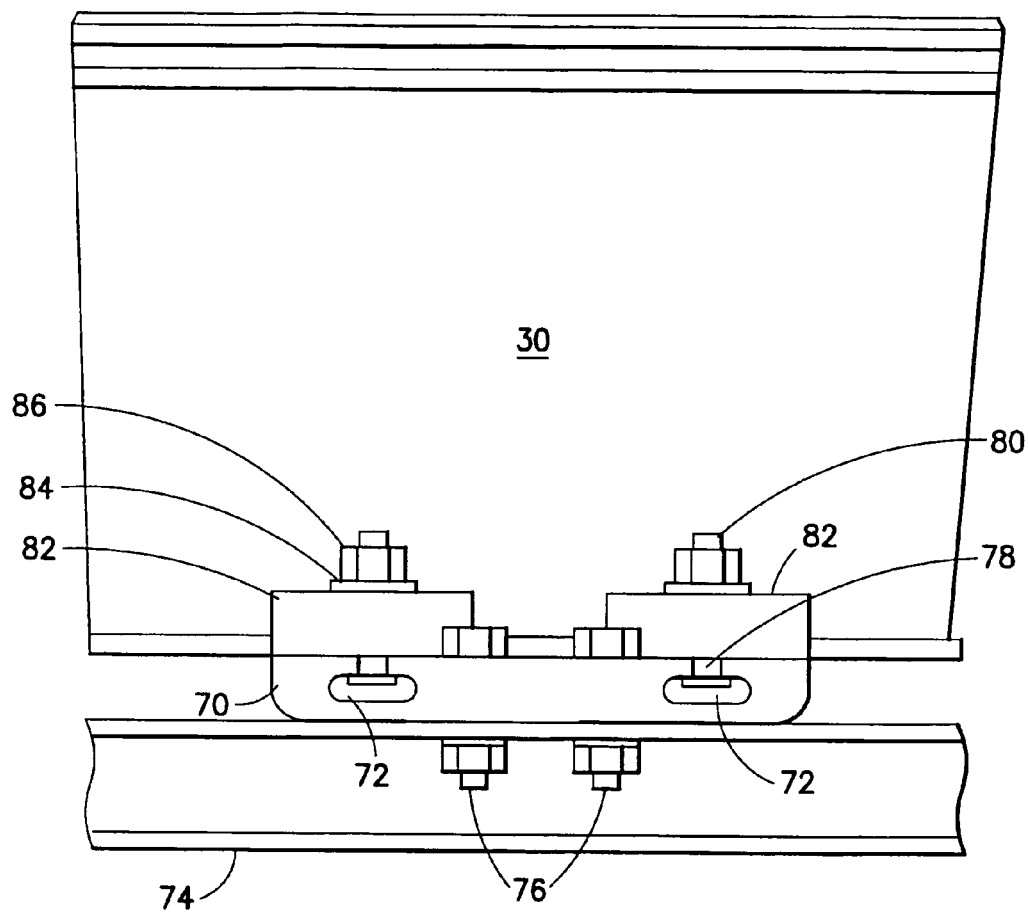
FIG. 6 is a perspective view of a second embodiment of the interconnection system of the subject invention.

FIG. 6 illustrates a second embodiment of the subject invention wherein the support structure is in the form of flat plates, rather than I-beams. Instead of I-beams, the support structure consists of an elongated planar plate 70 including longitudinally-extending T-shaped keyway slots 72, 72. Holes are pre-drilled into the support plate 70, and the support plate is anchored to the supporting substrate 74 of the helicopter deck by bolts 76, 76. The T-shaped keyway slots 72, 72 receive the heads 78 of the carriage bolts 80. Similar to the structure in the first embodiment of the subject invention, the carriage bolts 80 extend through holes in fixture blocks 82 and through holes in the lower flange of the deck slat 30, and the carriage bolts are secured in place by means of washers 84 and nuts 86.

Given the foregoing, variations and modifications to the invention should now be apparent to a person having ordinary skill in the art. For example, the striations in the fixture block may be of triangular cross-section, rather than square, and the number of striations may vary according to the structural requirements of the helicopter deck. These variations and modifications are intended to fall within the scope and spirit of the invention as defined by the following claims.

What is claimed is:

1. A heliport comprising:
   a planar member that is formed by arranging and joining together a plurality of longitudinal deck materials, each longitudinal deck material having a longitudinally extending, T-slot formed in the upper side thereof;
   a plurality of deck slats disposed over the planar member, with each slat in the form of a generally I-beam configuration, and with a lower flange thereof having a plurality of longitudinally-extending striations;

a plurality of fixture blocks, each having a hole therein, and including a plurality of striations for cooperatively engaging the striations in the lower flange of a deck slat; and a fastener having one end disposed in said T-slot, and extending through a fixture block and connected at its opposite end for rigidly interconnecting the planar member, the fixture block and the deck slat.

2. A heliport according to claim 1 wherein one or two fixture blocks are employed for interconnecting the planar member to a deck slat.

3. A heliport according to claim 1 wherein the fastener is in the form of a carriage bolt, with the head thereof being disposed in said T-slot in the planar member.

4. A heliport according to claim 1 wherein the opposite ends of the upper flange of the deck slat is of the tongue-and-groove configuration.

5. A heliport according to claim 1 wherein each planar member is of I-beam configuration.

6. A heliport according to claim 1 wherein each deck slat is integrally formed by extrusion molding in the longitudinal direction.

7. A heliport according to claim 1 wherein the plurality of striations of each deck slat and the corresponding plurality of striations of the fixture block are generally square in cross-section.

8. A heliport comprising:

a planar member that is formed by arranging and joining together a plurality of longitudinal deck materials, each longitudinal deck material having a longitudinally-extending, T-slot formed in the upper side thereof;

a plurality of deck slats disposed over the planar member, with each slat in the form of a generally I-beam configuration, and with a lower flange thereof having a plurality of longitudinally-extending striations, and wherein the upper flange of each deck slat is of the tongue-and-groove configuration;

a plurality of fixture blocks, each having a hole therein, and including a plurality of striations for cooperatively engaging the striations in the lower flange of a deck slat; and a carriage bolt having the head portion thereof disposed in a T-slot, and extending through the hole in a fixture block and connected at its opposite end by a washer and nut for rigidly interconnecting the planar member, the fixture block and the deck slat.

9. A heliport according to claim 8 wherein the plurality of striations of each deck slat and the corresponding plurality of striations of the fixture block are generally square in cross-section.

10. The heliport according to claim 8 wherein the deck slats and the longitudinal deck materials of the planar member are integrally formed by extrusion molding in the longitudinal direction.

11. The heliport according to claim 10 wherein the deck slats are made of aluminum.

12. The heliport according to claim 8 wherein each longitudinal deck material of the planar member is of generally I-beam configuration.

* * * * *